(12) United States Patent
Jokimies et al.

(10) Patent No.: US 7,764,927 B2
(45) Date of Patent: *Jul. 27, 2010

(54) METHOD AND APPARATUS FOR CONTROLLING ENCODING OF A DIGITAL VIDEO SIGNAL ACCORDING TO MONITORED PARAMETERS OF A RADIO FREQUENCY COMMUNICATION SIGNAL

(75) Inventors: Matti Jokimies, Salo (FI); Markus Hakaste, Helsinki (FI); Vesa Lunden, Lempäälä (FI); Petri Jarvinen, Tampere (FI); Marko Luomi, Tampere (FI)

(73) Assignee: Nokia Corporation, Espoo (FI)

( * ) Notice: Subject to any disclaimer, the term of this patent is extended or adjusted under 35 U.S.C. 154(b) by 868 days.

This patent is subject to a terminal disclaimer.

(21) Appl. No.: 11/471,964

(22) Filed: Jun. 21, 2006

(65) Prior Publication Data

US 2007/0120950 A1 May 31, 2007

Related U.S. Application Data

(63) Continuation of application No. 10/606,522, filed on Jun. 26, 2003, now abandoned, which is a continuation of application No. 09/370,661, filed on Aug. 6, 1999, now Pat. No. 6,611,674.

(30) Foreign Application Priority Data

Aug. 7, 1998 (GB) ................. 9817292.7

(51) Int. Cl.
*H04B 7/24* (2006.01)
(52) U.S. Cl. .............. 455/39; 455/24; 455/69.1; 455/126; 455/522; 370/328; 370/338
(58) Field of Classification Search ............. 455/39, 455/24, 69, 126, 522; 370/328, 338
See application file for complete search history.

(56) References Cited

U.S. PATENT DOCUMENTS

| 5,278,866 A | 1/1994 | Nonami ................. 375/227 |
| 5,386,589 A | 1/1995 | Kanai .................... 455/423 |
| 5,557,639 A | 9/1996 | Heikkila et al. ........... 375/224 |

(Continued)

FOREIGN PATENT DOCUMENTS

EP     0 739 139     10/1996

(Continued)

OTHER PUBLICATIONS

Spanik et al., DFU & BTX Entering without Exiting (New, the Computer Show), 1993, Markt und Technik Publishers, ISBN 3-87791-462-4.

(Continued)

*Primary Examiner*—Nghi H Ly
(74) *Attorney, Agent, or Firm*—Perman & Green LLP

(57) ABSTRACT

A mobile terminal includes means for controlling the encoding of a digital video signal that further includes means for monitoring at least one parameter of a radio frequency communication signal received at the mobile terminal. The control means also includes a means for forming a signal to the monitored parameter for controlling at least one encoding parameter of the video encoder.

58 Claims, 2 Drawing Sheets

U.S. PATENT DOCUMENTS

| | | | | |
|---|---|---|---|---|
| 5,568,200 | A | 10/1996 | Pearlstein et al. | 348/466 |
| 5,590,405 | A | 12/1996 | Daly et al. | |
| 5,596,677 | A | 1/1997 | Jarvinen et al. | 704/220 |
| 5,603,093 | A | 2/1997 | Yoshimi et al. | |
| 5,699,365 | A | 12/1997 | Klayman et al. | 714/774 |
| 5,742,892 | A | 4/1998 | Chaddha | 725/146 |
| 5,761,223 | A | 6/1998 | Ando et al. | 714/774 |
| 5,835,508 | A | 11/1998 | Kushita | |
| 5,835,889 | A | 11/1998 | Kapanen | 704/215 |
| 5,854,978 | A | 12/1998 | Heidari | 455/418 |
| 5,859,843 | A | 1/1999 | Honkasalo et al. | 370/342 |
| 5,870,666 | A | 2/1999 | Tanaka et al. | 455/67.1 |
| 5,893,061 | A | 4/1999 | Gortz | 704/262 |
| 5,926,232 | A * | 7/1999 | Mangold et al. | 375/240.27 |
| 5,940,439 | A | 8/1999 | Kleider et al. | 375/225 |
| 6,130,880 | A | 10/2000 | Naudus et al. | 370/235 |
| 6,182,264 | B1 | 1/2001 | Ott | 714/774 |
| 6,539,205 | B1 | 3/2003 | Wan et al. | |
| 6,611,674 | B1 * | 8/2003 | Jokimies et al. | 455/69 |

FOREIGN PATENT DOCUMENTS

| | | |
|---|---|---|
| EP | 0 771 120 | 5/1997 |
| EP | 0 882 667 | 2/1998 |
| GB | 2 297 885 | 8/1996 |
| GB | 2 306 867 | 5/1997 |
| JP | 4176291 A | 6/1992 |
| WO | WO 97/26744 | 7/1997 |
| WO | WO 97/28619 | 8/1997 |
| WO | 97/41663 | 11/1997 |

OTHER PUBLICATIONS

Duelli, H., All about mobile radio telephone: service, applicatons, costs, uses; 1992, Franzis-Verlag GmbH & Co. KG, Munich, ISBN 3-7723-4252-3.

Agner, M., Using fax properly: advice that pays off; 1992, Franzis-Verlag GmbH & Co. KG, Munich, ISBN 3-7723-6994-4.

Markt&Technik, DFU & BTX, Einsteigen ohne Auszusteigen, Christian Spanik (Translation attached).

Funkschau Telecom, Alles uber Mobilfunk, Duelli/Pernsteiner (Translation attached).

Funkschau Telecom, Fax richtig einsetzen, Aigner/Piller (Translation attached).

* cited by examiner

METHOD AND APPARATUS FOR CONTROLLING ENCODING OF A DIGITAL VIDEO SIGNAL ACCORDING TO MONITORED PARAMETERS OF A RADIO FREQUENCY COMMUNICATION SIGNAL

CROSS-REFERENCE TO RELATED APPLICATIONS

This application is a continuation of U.S. application Ser. No. 10/606,522, filed 26 Jun. 2003, now abandoned which is a continuation of U.S. patent application Ser. No. 09/370,661, filed on Aug. 6, 1999, and issued as U.S. Pat. No. 6,611,674.

The present invention relates to a method and apparatus for digital video coding, and more particularly to digital video coding for wireless communication.

BACKGROUND

Digital video offers a great many advantages over traditional analogue systems, supporting services such as video telephony and multi-media applications. However, a key problem of digital video when compared to analogue systems is the demand it places on communications and storage resources. For example, a bandwidth of approximately 160 Mbps is required in order to transmit a broadcast quality video, which compares with a bandwidth of approximately 5 MHz for comparable quality analogue video. Thus, to be able to use digital video the digital signal requires reduction of the quantity of data.

Data reduction is achieved by using compression techniques to remove redundant data while still retaining sufficient information to allow the original image to be reproduced with an acceptable quality. There are two types of redundancy in video signals: spatial and temporal. For the coding of images, techniques which exploit spatial redundancy only are termed intra-frame (i.e. they treat each frame separately), while those used to exploit temporal redundancy are termed inter-frame (i.e. they exploit similarities between frames), the latter invariably also exploit spatial redundancy.

Several coding techniques have been developed for redundancy removal, these include run length coding, conditional replenishment, transform coding, Huffman coding and differential phase code modulation (OPOM). Many of these are utilised in key standards such as JPEG, MPEG-i and MPEG-2, and H.261/H.263. JPEG defines the form of compressed data streams for still images; MPEG/MPEG2 are for compression of moving pictures; H.261/H.263 have primarily been defined for video telephony applications employing low bit rate communications links (of the order of tens of kbitls).

Video compression and expansion systems are often referred to as 'video codecs~inferring the ability to both encode and/or decode images. Current video telephony systems have primarily been designed for use in PSTN or packet networks, and are governed by ITU-T recommendations 1-1.324, which covers low bit rate multimedia communication, and H.323, which covers video conferencing over traditional shared media local area networks. The video coding parameters of the algorithm controlling encoding in the video codec are normally selected on the basis of the relatively error free transmission channels these systems can provide. However, the video coding algorithms of video codecs are flexible in that they can allow selection of the coding parameters. This is particularly beneficial for transmission on channels which are prone to error. In such conditions the coding parameters can be modified so as to attempt to minimise the affect of transmission errors on the picture quality. Where errors have occurred in transmission, it has been found that the decoded video normally produces additional blockiness, annoying green and pink Squares, temporal jerkiness and sometimes chequered patterns.

In existing Systems, two parameters which are typically adjusted in encoding are the amount of intra-refresh information and frequency of start codes. in PSTN networks, the video codec starts the coding with a full intra-frame. Intraframe pictures are coded without reference to other pictures which means that they contain all the information necessary for their reconstruction by the decoder and for this reason they are an essential entry point for access to a video sequence. Because the resolution of intraframes is high, the compression rate is relatively low and therefore a full intra-frame places huge demands on the number of date bits required to define the picture. As a result, the transmission of a full intra on small bandwidth lines, and even using small buffers to minimise delays, takes large periods of time, to the extent that the decoder must freeze the previous picture on the screen for a while, in effect to allow the following picture to catch up. Thus, as an alternative approach, in succeeding frames, intra-frame information is updated (or refreshed) on sequential portions of the picture frames, rather than the whole picture frame typically on a block-by-block basis of 16×16 pixels, hence the picture is said to be intra-refreshed. If the rates at which the blocks are refreshed is slow (which it usually is in PSTN) transmission error artifacts on the image can live very long, and will vanish only when the erroneous block is intra-refreshed. In error prone networks, it is therefore necessary to increase the number of intra-refresh macro blocks in each frame, or the rate at which full intra frames are sent.

Another technique used to minimise the impact of transmission errors is to reduce the size of effected areas. Since the coded bit stream contains variable length coding (VLC) code words, an error in the bit stream in most cases causes the decoder to lose synchronisation with VLC code words. The decoder can only continue decoding after receiving a fixed length distinct code word called a start code. Typically, start codes are found at the beginning of coded picture frames, however most video coding standards also allow start codes to be inserted elsewhere in a picture, for instance at the beginning of each row of macro blocks or even more often. Thus in order to reduce the size of the areas affected by transmission errors, start codes can be introduced in the picture at more frequent locations. The density of these start codes is a compromise between reduced picture quality owing to an increased number of header bits, and the size of the area which is affected by transmission errors. In error prone environments it is advantageous to sacrifice some visual image quality in order to reduce the image area affected by transmission errors.

The overall current approach is to pre-program intra-refresh information and start code parameters into the algorithm controlling the video codec depending on the anticipated level of transmission errors. Since these parameters can be varied in an encoder, if for example there is a high probability of losing a significant amount of information in a transmission then the intra-refresh information and start code parameters are sent more often. However with high C/I (carrier to interference) or C/N (carrier to noise ratio) levels relatively less intra-refresh or start code information is required, thus allowing for better image quality.

Insertion of additional intra-refresh data and start codes is reasonably effective for mitigating the effects of predictable transmissions errors, but these approaches are not without certain shortcomings. Principally, these shortcomings stem from the fact that actual transmission errors are not always predictable, and in situations where there is a wide margin between the predicted transmission error and the actual transmission error, the intrarefresh and start code parameters will not be consistent with the required level for these encoding parameters. For example, on one hand if the transmission errors are less than anticipated then the level of intra-refresh or start code information will be in excess of that required, and the excess will thus be redundant. On the other hand, if the transmission errors are much worse than those predicted, then the intra-refresh and start code information will be insufficient, and spread so widely both temporally and spatially in the decoded pictures that the result will be poor image quality. Coding parameters are thus set at an intermediate rate, but of course in this case image quality is compromised and thus not at an optimum.

Against this background, the present invention aims to address the problems arising from transmission errors on video coded signals.

SUMMARY

Accordingly, and in a first aspect, the present invention provides a method of operating a digital video codec for providing encoded video data for radio communication between a portable radio communication apparatus and a radio communication network, the method comprising monitoring at least one criterion of the radio communication signal and providing a signal responsive to said at least one monitored criterion for controlling at least one output parameter of the digital video codec.

In an alternate expression of the invention, the signal provided responsive to said at least one monitored criterion controls at least one coding parameter of the algorithm for encoding the video data in the digital video codec.

By means of the invention, the coding parameters of the video coded signal and hence the quality of the received image can be optimised for any given condition of a transmission channel. In for example a good channel connection the image quality is enhanced because less intra-refresh information and other overhead information is required. On the other hand where the channel connection is poor, better image quality can be assured because more intra-refresh information can be provided and less enduring and wide spreading errors occur in the image. Furthermore, by providing signals for optimal selection of video coding parameters based on radio channel measurements the use of radio resources is more efficient.

In preferred embodiments of the invention, the at least one monitored criteria can be the received signal quality and/or received signal strength, and/or the transmission power.

Advantageously, the signal responsive to said at least one monitored criteria is a feedback signal providing using H.245 control protocol.

It is preferred that during transmission of the radio communication signal by the radio communication network, the portable radio communication apparatus monitors received signal quality and/or received signal strength.

Advantageously, during transmission from the portable radio communication apparatus, the portable radio communication apparatus monitor~transmission power.

In preferred embodiments of the invention, the at least one output parameters comprise intra-refresh data and/or start codes.

In a second aspect of the present invention there is provided apparatus for performing the method hereinbefore defined.

The invention extends to a digital video codec arranged to provide encoded video data for radio communication between a portable radio communication apparatus and a radio communication network, the video codec being operable to modify at least one coding parameter of the algorithm for encoding the video data in response to feedback signals associated with at least one monitored criterion of the radio communication signal.

BRIEF DESCRIPTION OF THE DRAWINGS

The present invention will now be described by way of example with reference to the accompanying drawings in which.

DETAILED DESCRIPTION

Figure 1:
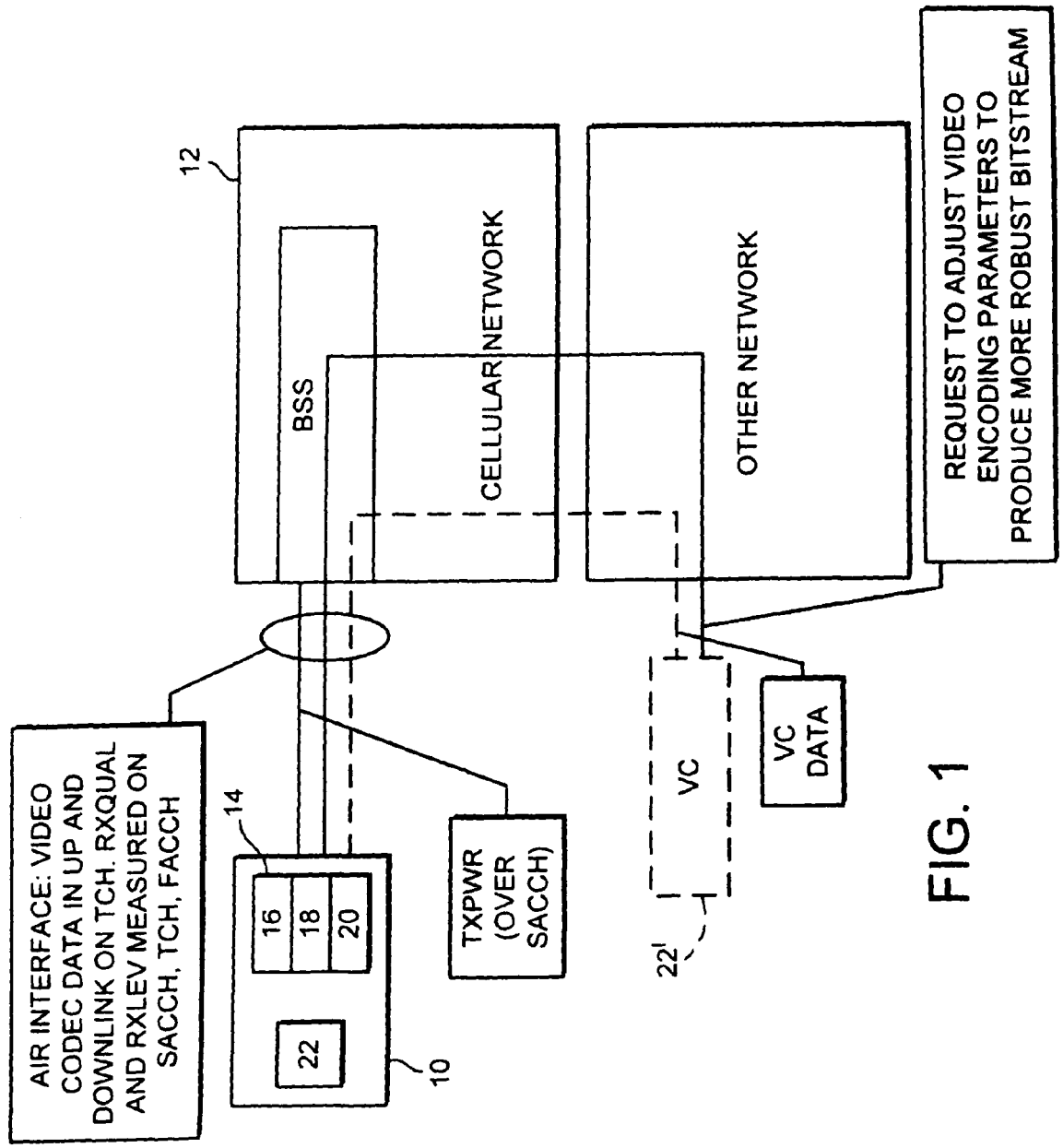
FIG. 1 is a schematic representation of the system according to at least a preferred embodiment of the present invention.

In the block diagram cellular telephone system shown in FIG. 1, a mobile station 10 is linked to operate in a cellular network 12, transferring data and digitised signals in a two way radio communication link. The cellular network 12 typically comprises an array of base stations which are linked together either directly or indirectly via mobile switching centres, and which enable information to be routed between mobile stations as well as landline telephones.

The mobile station 10 is equipped with the standard features associated with a mobile communication device: a keypad for dialing numbers, accepting and terminating a call, storing telephone numbers, and so on; a microphone and a loudspeaker; an antenna for radiating electromagnetic waves at transmission frequencies during transmission, and during reception for converting received electromagnetic waves at reception frequencies into electrical signals, and an RF block 14 comprising a receiver 16, synthesizers 18 and a transmitter 20. The mobile station 10 is further provided with a video codec 22 which, as explained above, can perform video compression (encode) and/or expansion (decode) for transmission and reception of video images. A video telephony system having full functionality also contains other related blocks such as audio codec, and mulitplexer/demultiplexer which take care of combining the coded video and audio into a single bitstream and so on.

An alternative arrangement is shown in dashed lines in FIG. 1, in which the video codec 22' is remote from the mobile station 10. In such a situation, the video codec communicates (remotely) with the mobile station through the cellular or some other network.

Alternatively, it is envisaged that the mobile station may be a radio card and that the video codec is provided in a computer (e.g. portable computer) to which the radio card can be connected via, for example, a PCMCIA connection. In this case, instructions from a mobile station 10 may be sent to he video codec 22' over AT commands and the data transfer between the video codec and the mobile station may be performed over a V.80 connection.

It will be apparent that the transfer of video signals between a mobile station and a cellular network can occur in two directions: in one direction, the network transmits whilst the mobile station receives, this is known as the down-link direction; in the other direction, the mobile station transmits whilst the network receives, and this is known as the up-link direction. End-to end use refers to the situation in which two mobile stations are in communication with one another through the telecommunication network.

Figure 2:
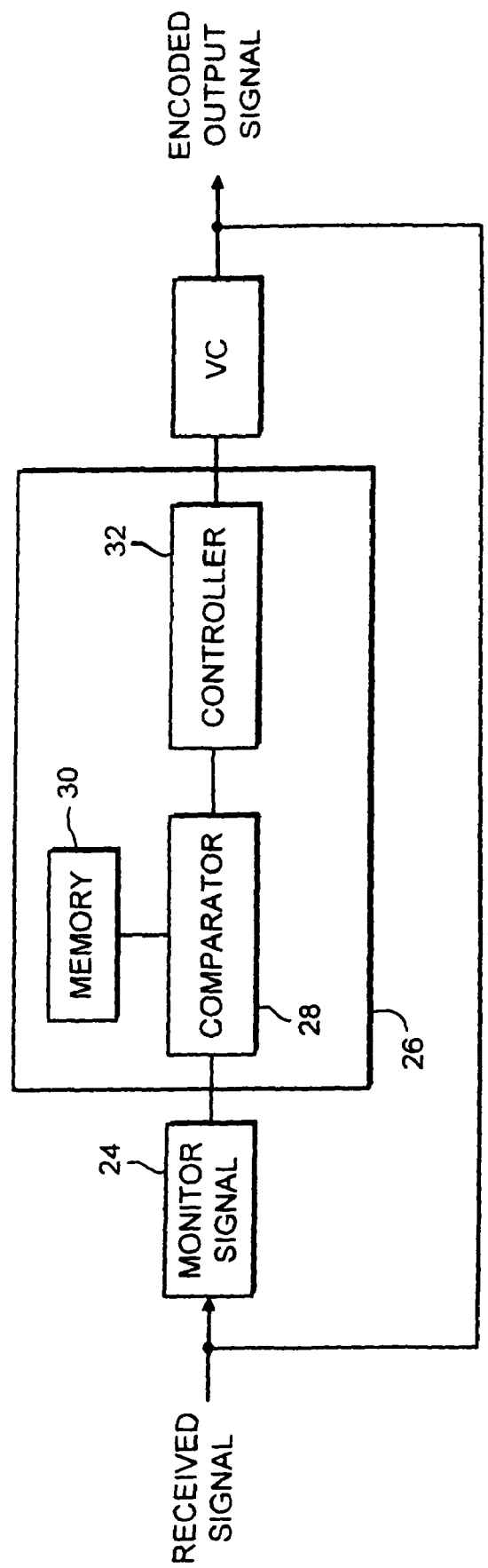
FIG. 2 is block diagram of one embodiment of the present invention.

A first embodiment of the present invention operating in the down-link direction will be described with reference to FIG. 2.

In down-link mode, the mobile station 10 receives data transmitted by the network 12 and continuously monitors at 24, in the preferred embodiment, the received signal quality and signal strength. In GSM these requirements are defined in GSM 05.08 and are used for example for handover decisions. The received signal quality and signal strength provides an indication of C/I (carrier to interference) and C/N (carrier to noise ratio).

In GSM 05.08 the received signal strength (or received signal level) of the serving base station is denoted by the two parameters: RXLEV_FULL SERVING_CELL and RXLEV_ SUB_SERVING_CELL. The received signal strength is referred to in this text as RXLEV, which may be RXLEV FULL SERVING CELL or RXLEV SUB SERVING CELL, depending on the use of discontinuous transmission (DTX) during the call.

Similarly in GSM 05.08 the received signal quality is denoted by RXQUAL FULL SERVING CELL and RXQUAL SUB SERVING_CELL, depending on the use of DTX, and in this text is referred to by the term RXQUAL.

The signal power is measured by the receiver, and it is mapped to RXLEV values as presented in GSM 05.08. Whilst RXLEV may not always correlate with C/N, a low RXLEV value indicates low signal strength, hence low C/N on the radio path. High RXLEV does not necessarily indicate high C/N, because high RXLEV may be generated by high interference levels as well.

RXQUAL is an estimate of bit error rate (BER) in the received signal before channel decoding. Mapping between BER and RXQUAL is described in GSM 05.08. High BER values are caused either by low C/N or by low C//, while lower BER values coincide with either higher C/N or high C/I.

In the GSM system, RXLEV is usually compared to signal strengths of the neighbouring base stations and used as the criterion for inter-cell handover. RXQUAL is typically used as the criterion for intra-cell channel changes.

In the presented invention, it is possible to detect low C/I and low C/N from RXQUAL alone, but RXLEV information could also be utilised to improve accuracy.

The output value of the monitored signal, ie. a value indicative of the received signal's quality and strength, is fed to a control system 26. It should be noted that the control system 26 can be part of the mobile station 10, or alternatively it can be located in the network 12, in which case the monitored signal is transmitted by the mobile station 10.

The control system 26 comprises a comparator 28, memory means 30 associated with the comparator 28, and a controller 32 downstream of the comparator 28. The output value of the monitored signal is fed into the comparator 28 which compares this value with values for signal quality and strength taken from the memory means 30. The memory means 30 contains a store of values for signal quality and strength correlated to acceptable images when decoded. The store of values includes upper limits and lower limits of operation, thereby defining preferred operating ranges. These would normally be factory set but could be user defined. The comparison made in the comparator 28 provides information as to whether the monitored values of the received signal are within the preferred operating ranges, above them or below them. For example, if transmission errors are high then the received signal would be relatively weak and the comparator 28, comparing this against stored values, would output a result reflecting this.

The output from the comparator 28 is fed into the controller 32. On the basis of the result of the comparator 28, the controller 32 decides whether or not to change the coding parameters of the transmitting video codec. If the result from the comparator 28 is that the monitored received signal is within its preferred operating range then the controller 32 directs no changes in the coding parameters. On the other hand, if the monitored signal is outside its preferred operating range then the controller 32 commands a change in the operation of the video codec. For example, in the case of high transmission error the controller 32 commands the encoding video codec to produce a more robust bit stream with more intra-refresh information and/or start codes. Hence, the quality of the image generated by the decoding video codec will be much improved. In this way, in down-link mode, the mobile station has adaptive control of the encoding parameters of the transmitting video codec.

The transmitting video codec may be located in the network itself, or, in an end-to-end communication would be located in the transmitting mobile station. One possible means for the receiving mobile station to command a change in operating performance of the transmitting video codec in another mobile station is to use H.245 Control Protocol specification for Multimedia Communication.

In the latter instance, the command to change the operating performance of the transmitting video codec are sent from the receiving mobile station to the network, and this command is then fed by the network to the remote transmitting mobile station. Accordingly, it is possible for a first mobile station to affect the video coding parameters of a second mobile station by monitoring the condition of the radio link on its side of the network and providing feedback information thereon.

In the up-link direction in which the mobile station transmits and the cellular network receives, a similar process may be employed whereby the signal received at the base station is used as an indication of the quality of the link, and which is monitored and then fed back to the mobile station for modifying the operation of the video codec.

However, currently in GSM it is not possible for the mobile station directly to obtain information about the receive quality levels measured at the base station. Nor is this information delivered from the cellular network to the mobile station. Thus in order to obtain a measure of the quality of the up-link connection, use is made of the up-link power level. In GSM this is defined in GSM 05.08. The up-link power level is a parameter that is commanded by the network. So at times when the signal level and quality of the up-link transmission deteriorates, the network commands the transmission power of the mobile station to be increased. This request for higher transmission power is discerned by the mobile station which in turn triggers an increase in the intra-refresh and start code parameters of the video codec, provided that the change in power level is deemed to be high enough. In this regard, the mobile station is provided with look-up tables stored in the memory means which contain information on the correlation between transmission power levels and the appropriate density of coding parameters in a coding algorithm.

Returning to FIG. 1, TXPWR refers to the regularly transmitted network request to increase or decrease transmitter power. This is defined in GSM 05.08 as parameter MS_TX-PWR_REQUEST. Alternatively or in addition, use could also be made of other power level related information sent by the network, such as power level commands in connection with handover.

The box in FIG. 1 labelled 'other network' can also be an ascending network ISDN, PSTN or even the same network where the mobile station with the video codec is connected. As mentioned above, it will be appreciated that received signal quality and received signal strength could also be used in the network side with a link between the network and video codec in the mobile station. In principle, it is possible to store the intra-frames in a dedicated memory unit in the network for example in the base station. Stored frames could then be retransmitted whenever the radio interlace parameters indicated that the C/I or C/N ratio is low.

Whilst the invention has been described in the context of circuit switched transparent mode, the invention can be applied also in packet switched unacknowledged mode. The invention as such can be used in packet switched acknowledged and circuit switched non transparent mode. Of course in these cases there is the general penalty of harmful retransmission in a real time service. However in principal the invention itself is applicable irrespective of the way the radio interface is implemented. In addition to RXQUAL and RXLEV other parameters also can be used to determine the quality of the connection. These may include retransmission of signaling frames, number of lost frames, number of retransmissions of data frames on RLC layer in GPRS acknowledged mode. In GPRS the variance of the signal level (BLVAR SIGNVAR) could be one of the parameters to be measured. In addition, a further parameter which may be monitored may be that of the video signal itself. For example bit error rate in the received video stream as monitored by a demulitplexer in a multimedia terminal performing a cyclic redundancy check may be used as an indication for controlling the transmitting video codec.

Optionally, when an intra-frame is being transmitted by a mobile station and hand over takes place, the intra-frame can be retransmitted because the first one may be lost due to the hand over. The same also applies to other changes in the channel mode for example between GMSK and EDGE modulations. In down-link, the mobile station may request an extra intra-frame after every hand over or channel mode change because an intra-frame may have been lost in the down link direction.

It is envisaged that the present invention will be particularly beneficial in cases where the variation in the radio parameters becomes large. For example this happens in GSM with EDGE (Enhanced Data rates for GSM Evolution), because in EDGE the data quality may vary significantly. Also very frequent channel coding or modulation changes characteristic of EDGE destroy frames, thus it is advantageous to increase the rate of intra-refresh and/or start code information when required.

The present invention may be embodied in other specific forms without departing from its essential attributes. Accordingly reference should be made to the appended claims and other general statement's herein rather than to the foregoing specific description as indicating the scope of invention.

Furthermore, each feature disclosed in this specification (which term includes the claims) and/or shown in the drawings may be incorporated in the invention independently of other disclosed and/or illustrated features. In this regard, the invention includes any novel feature or combination of features disclosed herein either explicitly or any generalisation thereof irrespective of whether or not it relates to the claimed invention or mitigates any or all of the problems addressed.

The appended abstract as filed herewith is included in the specification by reference.

What is claimed is:

1. A method for providing feedback to control source encoding of a digital video signal, the method comprising:
    monitoring a radio frequency communication signal at a receiving end of an air interface, to monitor at least one parameter indicative of a property of the radio frequency communication signal itself, as received at the receiving end of the air interface, to obtain an indication of a channel condition of the air interface, the radio frequency communication signal carrying an encoded video signal formed by a video encoder at a transmitting end of the air interface;
    responsive to said at least one monitored parameter indicative of a property of the radio frequency communication signal itself, generating a feedback signal at the receiving end of the air interface for controlling at least one source encoding parameter of the video encoder at the transmitting end of the air interface, the feedback signal configured to command an increase in error robustness of the source encoding in comparatively worse channel conditions and correspondingly a reduction in overhead in the source encoding in comparatively better channel conditions; and
    transmitting said feedback signal over the air interface to affect control of said at least one source encoding parameter at the video encoder.

2. A method according to claim 1, comprising comparing a value of said at least one monitored parameter with stored upper and lower operating limit values and generating the feedback signal on the basis of whether the value of said at least one monitored parameter is within the upper and lower operating limits.

3. A method according to claim 2, wherein the comparing is based on user-defined upper and lower operating limits.

4. A method according to claim 2, comprising generating the feedback signal on the basis of said comparing to command the video encoder at the transmitting end of the air interface to produce a more robust bit-stream with more intra-refresh information in comparatively worse channel conditions.

5. A method according to claim 2, comprising generating the feedback signal on the basis of said comparing to command the video encoder at the transmitting end of the air interface to produce a more robust bit-stream with more start codes in comparatively worse channel conditions.

6. A method according to claim 1, wherein monitoring the radio frequency communication signal comprises monitoring a measure of received signal quality of the radio frequency communication signal itself to obtain an indication of a channel condition of the air interface.

7. A method according to claim 1, wherein monitoring the radio frequency communication signal comprises monitoring a measure of received signal strength of the radio frequency communication signal itself to obtain an indication of a channel condition of the air interface.

8. A method according to claim 1, wherein monitoring the radio frequency communication signal comprises monitoring one or more of the GSM parameters: RXLEV_FULL_SERVING_CELL; RXLEV_SUB_SERVING_CELL; RXQUAL_FULL_SERVING_CELL; and RXQUAL_SUB_SERVING_ CELL.

9. A method according to claim 1, comprising using an end-to-end control protocol to transmit said feedback signal over the air interface.

10. A method according to claim 9, comprising using a control protocol according to the H.245 control protocol specification for multimedia communication to transmit said feedback signal over the air interface.

11. A method according to claim 2, comprising generating the feedback signal on the basis of said comparing to control the frequency of occurrence of intra-refresh data in the encoded video signal.

12. A method according to claim 2, comprising generating the feedback signal on the basis of said comparing to control the frequency of occurrence of start codes in the encoded video signal.

13. A method according to claim 1, wherein monitoring the radio frequency communication signal comprises monitoring any one of a carrier-to-interference ratio, a carrier-to-noise ratio and the variance of a GPRS signal level.

14. An apparatus for providing feedback to control the source encoding of a digital video signal, the apparatus comprising:
a signal monitor configured to monitor a radio frequency communication signal at a receiving end of an air interface, to monitor at least one parameter indicative of a property of the radio frequency communication signal itself, as received at the receiving end of the air interface, to obtain an indication of a channel condition of the air interface, the radio frequency communication signal carrying an encoded video signal formed by a video encoder at a transmitting end of the air interface; and
a controller configured to generate a feedback signal at the receiving end of the air interface, responsive to said at least one monitored parameter indicative of a property of the radio frequency communication signal itself, for controlling at least one source encoding parameter of the video encoder at the transmitting end of the air interface, the feedback signal configured to command an increase in error robustness of the source encoding in comparatively worse channel conditions and correspondingly a reduction in overhead in the source encoding in comparatively better channel conditions.

15. An apparatus according to claim 14, comprising a comparator configured to compare a value of said at least one monitored parameter with stored upper and lower operating limit values, wherein the controller is configured to generate the feedback signal on the basis of whether the value of said at least one monitored parameter is within the upper and lower operating limits.

16. An apparatus according to claim 15, wherein the controller is configured to, on the basis of said comparison, command the video encoder at the transmitting end of the air interface to produce a more robust bit-stream with more intra-refresh information in comparatively worse channel conditions.

17. An apparatus according to claim 15, wherein the controller is configured to, on the basis of said comparison, command the video encoder at the transmitting end of the air interface to produce a more robust bit-stream with more start codes in comparatively worse channel conditions.

18. An apparatus according to claim 14, wherein the signal monitor is configured to monitor a measure of received signal quality of the radio frequency communication signal itself to obtain an indication of a channel condition of the air interface.

19. An apparatus according to claim 14, wherein the signal monitor is configured to monitor a measure of received signal strength of the radio frequency communication signal itself to obtain an indication of a channel condition of the air interface.

20. An apparatus according to claim 14, wherein the signal monitor is configured to monitor one or more of the GSM parameters: RXLEV_FULL_SERVING_CELL; RXLEV_SUB_SERVING_CELL; RXQUAL_FULL_SERVING_CELL; and RXQUAL_SUB_SERVING_CELL.

21. An apparatus according to claim 15, wherein the controller is configured to generate the feedback signal on the basis of said comparison to control the frequency of occurrence of intra-refresh data in the encoded video signal.

22. An apparatus according to claim 15, wherein the controller is configured to generate the feedback signal on the basis of said comparison to control the frequency of occurrence of start codes in the encoded video signal.

23. An apparatus according to claim 14, wherein the apparatus is a portable radio communications apparatus.

24. An apparatus according to claim 14, wherein the apparatus is a base station of a cellular communications network.

25. An apparatus according to claim 14, wherein the signal monitor is configured to monitor any one of a carrier-to-interference ratio, a carrier-to-noise ratio and the variance of a GPRS signal level.

26. An apparatus according to claim 14, wherein the apparatus is configured to transmit said feedback signal over the air interface to affect control of said at least one source encoding parameter at the video encoder.

27. An apparatus according to claim 26, wherein the apparatus is configured to use an end-to-end control protocol to transmit said feedback signal over the air interface.

28. An apparatus according to claim 27, wherein the apparatus is configured to use a control protocol according to the H.245 control protocol specification for multimedia communication to transmit said feedback signal over the air interface.

29. A method for providing feedback to control source encoding of a digital video signal, the method comprising:
monitoring a radio frequency communication signal at a transmitting end of an air interface, to monitor at least one parameter indicative of a property of the radio frequency communication signal itself, as transmitted from the transmitting end of the air interface, to obtain an indication of a channel condition of the air interface, the radio frequency communication signal carrying an encoded video signal formed by a video encoder at the transmitting end of the air interface;
responsive to said at least one monitored parameter indicative of a property of the radio frequency communication signal itself, generating a feedback signal at the transmitting end of the air interface for controlling at least one source encoding parameter of the video encoder at the transmitting end of the air interface, the feedback signal configured to command an increase in error robustness of the source encoding in comparatively worse channel conditions and correspondingly a reduction in overhead in the source encoding in comparatively better channel conditions; and
providing the feedback signal to the video encoder to affect control of said at least one source encoding parameter at the video encoder.

30. A method according to claim 29, comprising comparing a value of said at least one monitored parameter with stored upper and lower operating limit values and generating the feedback signal on the basis of whether the value of said at least one monitored parameter is within the upper and lower operating limits.

31. A method according to claim 30, wherein the comparing is based on user-defined upper and lower operating limits.

32. A method according to claim 30, comprising generating the feedback signal on the basis of said comparing to command the video encoder at the transmitting end of the air interface to produce a more robust bit-stream with more intra-refresh information in comparatively worse channel conditions.

33. A method according to claim 30, comprising generating the feedback signal on the basis of said comparing to command the video encoder at the transmitting end of the air interface to produce a more robust bit-stream with more start codes in comparatively worse channel conditions.

34. A method according to claim 29, wherein monitoring the radio frequency communication signal comprises monitoring a measure of transmitted signal power of the radio frequency communication signal itself at said transmitting end of the air interface to obtain an indication of a channel condition of the air interface.

35. A method according to claim 29, wherein monitoring the radio frequency communication signal comprises monitoring power control commands received at said transmitting end of the air interface to obtain an indication of a channel condition of the air interface.

36. A method according to claim 29, comprising generating the feedback signal to command the video encoder to increase intra-refresh and start code parameters responsive to a request, received at the transmitting end of the air interface, for a sufficiently large increase in transmission power of the signal to be transmitted.

37. A method according to claim 30, comprising generating the feedback signal on the basis of said comparing to control the frequency of occurrence of intra-refresh data in the encoded video signal.

38. A method according to claim 30, comprising generating the feedback signal on the basis of said comparing to control the frequency of occurrence of start codes in the encoded video signal.

39. A method according to claim 29, wherein monitoring the radio frequency communication signal comprises monitoring power level commands sent in connection with handover.

40. A method according to claim 29, wherein monitoring the radio frequency communication signal comprises monitoring the GSM parameter MS_TXPWR_REQUEST.

41. An apparatus for providing feedback to control source encoding of a digital video signal, the apparatus comprising:
    a signal monitor configured to monitor a radio frequency communication signal at a transmitting end of an air interface, to monitor at least one parameter indicative of a property of the radio frequency communication signal itself, as transmitted from the transmitting end of the air interface, to obtain an indication of a channel condition of the air interface, the radio frequency communication signal carrying an encoded video signal formed by a video encoder at the transmitting end of the air interface; and
    a controller configured to generate a feedback signal at the transmitting end of the air interface, responsive to said at least one monitored parameter indicative of a property of the radio frequency communication signal itself, for controlling at least one source encoding parameter of the video encoder at the transmitting end of the air interface, the feedback signal configured to command an increase in error robustness of the source encoding in comparatively worse channel conditions and correspondingly a reduction in overhead in the source encoding in comparatively better channel conditions.

42. An apparatus according to claim 41, comprising a comparator for comparing a value of said at least one monitored parameter with stored upper and lower operating limit values, wherein the controller is configured to generate the feedback signal on the basis of whether the value of said at least one monitored parameter is within the upper and lower operating limits.

43. An apparatus according to claim 42, wherein the controller is configured to, on the basis of said comparison, command the video encoder at the transmitting end of the air interface to produce a more robust bit-stream with more intra-refresh information in comparatively worse channel conditions.

44. An apparatus according to claim 42, wherein the controller is configured to, on the basis of said comparison, command the video encoder at the transmitting end of the air interface to produce a more robust bit-stream with more start codes in comparatively worse channel conditions.

45. An apparatus according to claim 41, wherein the signal monitor is configured to measure a transmission power of the radio frequency communication signal itself at the transmitting end of the air interface to obtain an indication of a channel condition of the air interface.

46. An apparatus according to claim 41, wherein the signal monitor is configured to monitor power control commands received at the transmitting end of the air interface to obtain an indication of a channel condition of the air interface.

47. An apparatus according to claim 42, wherein the controller is configured to generate the feedback signal on the basis of said comparison to control the frequency of occurrence of intra-refresh data in the encoded video signal.

48. An apparatus according to claim 42, wherein the controller is configured to generate the feedback signal on the basis of said comparison to control the frequency of occurrence of start codes in the encoded video signal.

49. An apparatus according to claim 41, wherein the apparatus is a portable radio communications apparatus.

50. An apparatus according to claim 41, wherein the apparatus is configured to provide the feedback signal to the video encoder to affect control of said at least one source encoding parameter at the video encoder.

51. An apparatus according to claim 41, wherein the signal monitor is configured to monitor power level commands sent in connection with handover.

52. An apparatus according to claim 41, wherein the signal monitor is configured to monitor the GSM parameter MS_TXPWR_REQUEST.

53. Digital video encoding apparatus configured to operate in accordance with a source encoding procedure so as to provide an encoded video signal for transmission as a radio frequency communication signal from a transmitting end of an air interface to a receiving end of the air interface, the apparatus being configured to respond to a feedback signal based on at least one parameter indicative of a property of the radio frequency communication signal itself, monitored at the receiving end of the air interface, so as to control the source encoding procedure, the feedback signal configured to command an increase in error robustness of the source encoding in comparatively worse channel conditions and correspondingly a reduction in overhead in the source encoding in comparatively better channel conditions.

54. Digital video encoding apparatus configured to operate in accordance with a source encoding procedure so as to provide an encoded video signal for transmission as a radio frequency communication signal from a transmitting end of an air interface to a receiving end of the air interface, the apparatus being configured to respond to a feedback signal based on at least one parameter indicative of a property of the radio frequency communication signal itself, monitored at the transmitting end of the air interface, so as to control the source encoding procedure, the feedback signal configured to command an increase in error robustness of the source encoding in comparatively worse channel conditions and correspondingly a reduction in overhead in the source encoding in comparatively better channel conditions.

55. An apparatus for providing feedback to control the source encoding of a digital video signal, the apparatus comprising:

means for monitoring a radio frequency communication signal at a receiving end of an air interface, to monitor at least one parameter indicative of a property of the radio frequency communication signal itself, as received at the receiving end of the air interface, to obtain an indication of a channel condition of the air interface, the radio frequency communication signal carrying an encoded video signal formed by a video encoder at a transmitting end of the air interface;

means for controlling the generation of a feedback signal at the receiving end of the air interface, responsive to said at least one monitored parameter indicative of a property of the radio frequency communication signal itself, for controlling at least one source encoding parameter of the video encoder at the transmitting end of the air interface, the feedback signal configured to command an increase in error robustness of the source encoding in comparatively worse channel conditions and correspondingly a reduction in overhead in the source encoding in comparatively better channel conditions.

56. An apparatus for providing feedback to control source encoding of a digital video signal, the apparatus comprising:

means for monitoring a radio frequency communication signal at a transmitting end of an air interface, to monitor at least one parameter indicative of a property of the radio frequency communication signal itself, as transmitted from the transmitting end of the air interface, to obtain an indication of a channel condition of the air interface, the radio frequency communication signal carrying an encoded video signal formed by a video encoder at the transmitting end of the air interface; and means for controlling the generation of a feedback signal at the transmitting end of the air interface, responsive to said at least one monitored parameter indicative of a property of the radio frequency communication signal itself, for controlling at least one source encoding parameter of the video encoder at the transmitting end of the air interface, the feedback signal configured to command an increase in error robustness of the source encoding in comparatively worse channel conditions and correspondingly a reduction in overhead in the source encoding in comparatively better channel conditions.

57. Digital video encoding apparatus configured to operate in accordance with a source encoding procedure so as to provide an encoded video signal for transmission as a radio frequency communication signal from a transmitting end of an air interface to a receiving end of the air interface, the apparatus comprising means for controlling the source encoding procedure responsive to a feedback signal based on at least one parameter indicative of a property of the radio frequency communication signal itself, monitored at the receiving end of the air interface, the feedback signal configured to command an increase in error robustness of the source encoding in comparatively worse channel conditions and correspondingly a reduction in overhead in the source encoding in comparatively better channel conditions.

58. Digital video encoding apparatus configured to operate in accordance with a source encoding procedure so as to provide an encoded video signal for transmission as a radio frequency communication signal from a transmitting end of an air interface to a receiving end of the air interface, the apparatus comprising means for responding to a feedback signal based on at least one parameter indicative of a property of the radio frequency communication signal itself, monitored at the transmitting end of the air interface, the feedback signal configured to command an increase in error robustness of the source encoding in comparatively worse channel conditions and correspondingly a reduction in overhead in the source encoding in comparatively better channel conditions.

* * * * *